United States Patent [19]

Sato

[11] Patent Number: 4,765,429

[45] Date of Patent: Aug. 23, 1988

[54] FOUR WHEEL DRIVE VEHICLE WITH ANTI-LOCK BRAKING SYSTEM AND ASSOCIATED METHOD OF OPERATION

[75] Inventor: Makoto Sato, Wako, Japan

[73] Assignee: Honda Giken Kogyo Kabushiki Kaisha, Tokyo, Japan

[21] Appl. No.: 927,792

[22] Filed: Nov. 5, 1986

[30] Foreign Application Priority Data

Nov. 5, 1985 [JP] Japan ................ 60-247326
Nov. 5, 1985 [JP] Japan ................ 60-247327

[51] Int. Cl.⁴ ............................. B60T 8/26
[52] U.S. Cl. ...................... 180/197; 180/244; 180/249; 303/111
[58] Field of Search ........... 180/244, 248, 249, 250, 180/197; 303/111, 110, 119, 103, 106

[56] References Cited

U.S. PATENT DOCUMENTS 4,605,087 8/1986 Ashauer et al. ................ 180/248

FOREIGN PATENT DOCUMENTS 60-85052 5/1985 Japan ................ 303/111
60-143170 7/1985 Japan ................ 303/111

Primary Examiner—David M. Mitchell
Assistant Examiner—Charles R. Watts
Attorney, Agent, or Firm—Roberts, Spiecens & Cohen

[57] ABSTRACT

A four wheel drive vehicle with an antilock braking system in which front and rear axles are coupled together by a power transmission assembly capable of directly coupling or uncoupling the axles, a hydraulic braking system controls the hydraulic pressure applied to each brake disposed in the wheel of the respective axles and an antilock control device is disposed in the hydraulic braking system for controlling hydraulic braking pressure such that it may be reduced when the axle is just about to become locked. In such a four wheel drive vehicle, the antilock control device includes a front wheel control section arranged to control the hydraulic pressure applied to the front wheel brakes and a rear wheel control section arranged to control the hydraulic pressure applied to the rear wheel brakes. The rear wheel control section maintains the hydraulic braking pressure at a lower level when the power transmission assembly maintains a direct-coupled state as compared to when it maintains a non-direct-coupled state.

19 Claims, 7 Drawing Sheets

FOUR WHEEL DRIVE VEHICLE WITH ANTI-LOCK BRAKING SYSTEM AND ASSOCIATED METHOD OF OPERATION

BACKGROUND OF THE INVENTION (a) Field of the Invention

The present invention relates to a four wheel drive vehicle with an anti-lock braking system comprising front and rear axles coupled together by a power transmission assembly capable of directly coupling the front and rear axles, a brake attached to each of the front and rear wheels, and a hydraulic braking system for controlling the hydraulic pressure of each brake applied to the wheels, the hydraulic braking system including an anti-lock control device arranged to control the hydraulic braking pressure so that the braking pressure may be reduced to prevent locking of the wheels.

The invention further relates to the method of operation of the anti-lock braking system.

(b) Description of the Prior Art

There has been a continuing development process with respect to improving various aspects of the characteristics and running performance of four wheel drive vehicles while traveling on road surfaces which have a low coefficient of friction, and in addition, attempts have been made to equip such four wheel drive vehicles with anti-lock braking system.

In general, the anti-lock braking systems of the prior art have no problems in cases where a four wheel drive vehicle is set in the following modes: a lock mechanism in non-operational mode in which the front and rear axles are coupled to a power unit by means of a differential gear including the lock mechanism; and a clutch disengagement mode in which either the front or the rear axle is coupled to the power unit and at the same time the other axle is coupled to the power unit by the clutch which is manually brought into engagement and disengagement.

However, the following problem occurs when a four-wheel drive vehicle with a prior art anti-lock braking system is set in a mode in which the differential gear is locked or the clutch is engaged. Specifically, during a four wheel drive operation when the braking force applied to the front wheels is transmitted to the rear wheels, there is a tendency for mutual interference between the front wheels and the rear wheels, thereby making it difficult to achieve a satisfactory anti-lock effect.

SUMMARY OF THE INVENTION

Accordingly, an object of the present invention is to provide a four wheel drive vehicle with an anti-lock braking system capable of effectively carrying out anti-lock control of the front and rear wheels in a four wheel drive mode in which the front and rear axles are directly coupled together.

To this end, the present invention provides an anti-lock control device comprising a front wheel control section for controlling the hydraulic braking pressure applied to the front wheel brakes and a rear wheel control section for controlling the hydraulic braking pressure applied to the rear wheel brakes, the rear wheel control section maintaining the hydraulic braking pressure at a lower level when the power transmission assembly maintains a direct coupled state as compared to the braking pressure in uncoupled state.

With such a construction, when an anti-lock control operation is undertaken while the power transmission assembly is directly coupled in a four wheel drive mode, the braking torque acting on the rear wheels is maintained at a lower level than the driving force which the road surface beneath the rear wheels reactively applies to the rear wheels, thus reducing the interference of the rear wheels with the front wheels to a minimal level and thereby enabling an effective anti-lock control.

The above and other objects, features and advantages of the present invention will become apparent from the following description of preferred embodiments thereof, taken in conjunction with the accompanying drawing.

BRIED DESCRIPTION OF THE FIGURES OF THE DRAWING

DESCRIPTION OF THE PREFERRED EMBODIMENTS

Preferred embodiments of this invention will next be described with reference to the accompanying drawing.

Figure 1:
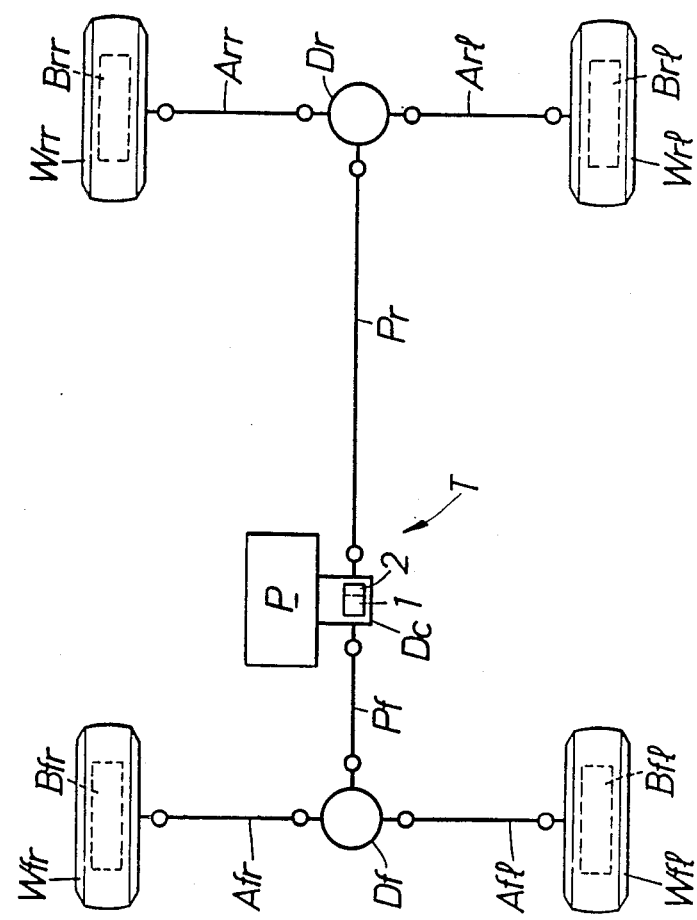
FIG. 1 is a schematic diagram of a drive system incorporating a first preferred embodiment of an anti-lock braking system in accordance with the present invention.

Referred first to FIG. 1 which schematically shows the first preferred embodiment of this invention, therein is seen a pair of left and right front wheels Wfr, Wfl and a pair of left and right rear wheels Wrr, Wrl respectively supported at the front and rear portions of a vehicle body (not shown).

A pair of left and right front axles Afr, Afl which are respectively connected to the left and right front wheels Wfr, Wfl are coupled together by a front differential gear Df, while a pair of left and right rear axles Arr, Arl which are respectively connected to the left and right wheels Wrr, Wrl are coupled together by a rear differential gear Dr.

The front and rear differential gears Df and Dr are coupled together by a power transmission assembly T including a front propeller shaft Pf connected to an input of the front differential gear Df, a rear propeller shaft Pr connected to an input of the rear differential gear Dr and a center differential gear Dc coupling the front and rear propeller shafts Pf and Pr together. A power unit P including an engine (not shown) and speed changing gears (not shown) is connected to an input of the center differential gear Dc.

The center differential gear Dc is provided with a lock mechanism 1. When the lock mechanism 1 is actuated, the vehicle is set in the four wheel drive mode in which the front and rear propeller shafts Pf and Pr are directly coupled together in such a manner that the braking force acting on the front wheels Wfr, Wfl is directly transmitted to the rear wheels Wrr, Wrl. An actuation detector 2 is so disposed as to detect the actuation of the lock mechanism 1.

Brakes Bfr and Bfl; Brr and Brl are attached to the front and rear wheels Wfr and Wrl; Wrr and Wrl, respectively.

Figure 2:
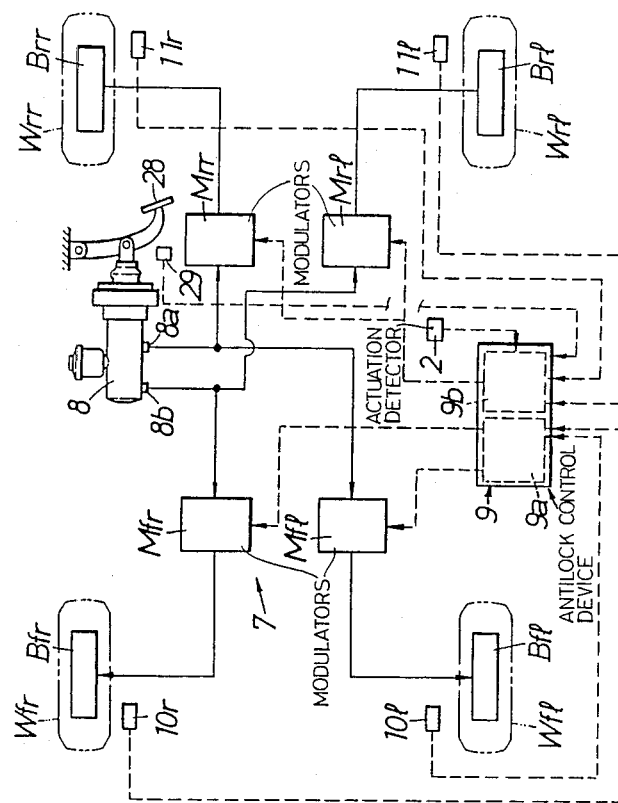
FIG. 2 is a schematic diagram of a braking system incorporating the first preferred embodiment of this invention.

Referring to FIG. 2, a hydraulic braking system 7 for controlling the hydraulic pressure applied to the brakes Bfr, Bfl, Brr and Brl includes a tandem type master cylinder 8 having a pair of output ports 8a and 8b, modulators Mfl and Mrr for regulating the hydraulic pressure supplied from the output port 8a and transmitting the thus regulated pressure to the left front wheel brake Bfl and the right rear wheel brake Brr, respectively, and modulators Mfr and Mrl for regulating the hydraulic pressure supplied from the output port 8b and transmitting the thus regulated pressure to the right front wheel brake Bfr and the left rear wheel brake Brl. The hydraulic braking system 7 further includes an anti-lock control device 9 for controlling the operation of each of the modulators Mfr, Mfl, Mrr and Mrl to prevent locking of each of the wheels.

The anti-lock control device 9 includes a front wheel control section 9a for individually controlling the modulators Mfr and Mfl for the front wheels Wfr, Wfl and a rear wheel control section 9b for providing synchronous control of the modulators Mrr and Mrl for the rear wheels Wrr and Wrl. Detectors 10r and 10l respectively detect the rotational speed of the front wheels Wfr, Wfl and supply the detected signals to the front wheel control section 9a, while detectors 11r and 11l respectively detect the rotational speed of the rear wheels Wrr, Wrl and supply the detected signals to the rear wheel control section 9b. Actuation detector 2 which detects whether or not the lock mechanism 1 is actuated, supplies the thus detected signal to the rear wheel control section 9b.

The contruction of the front wheel control section 9a will be described below, with specific reference to FIG. 3. In the control section 9a, the elements associated with the modulator Mfl have basically the same construction as the elements corresponding to the modulator Mfr. Therefore, the following description will refer to the constituent elements relating to the modulator Mfl with suffix l, while the constituent elements relating to the modulator Mfr are designated with suffix r and are merely illustrated and the specific description will be omitted for the sake of simplicity.

In order to determine incipient locking of the wheels i.e. whether or not the wheels are at the point where they are just about to become locked, a signal indicative of wheel velocity $V_W$ detected by the detector 10l is fed to an inverted terminal of a first comparator 13l and at the same time to an operation circuit 12l. The operation circuit 12l functions as a differentiator and produces a wheel acceleration signal $\dot{V}_W$ which is supplied to an inverted terminal of a second comparator 14l and to a non-inverted terminal of a third comparator 15l. The first comparator 13l compares a reference wheel velocity $V_R$ and the wheel velocity $V_W$ and, if $V_R > V_W$, the first comparator 13l produces an output signal λ indicative of a command to reduce braking oil pressure. The second comparator 14l compares a reference wheel deceleration $-\dot{V}_{WO}$ and the wheel acceleration $\dot{V}_W$ and, if $-\dot{V}_{WO} > \dot{V}_W$, the second comparator 14l produces an output signal β indicative of a command to reduce braking oil pressure. Furthermore, the third comparator 15l compares a reference wheel acceleration $+\dot{V}_{WO}$ and the wheel acceleration $\dot{V}_W$, and, if $\dot{V}_W > +\dot{V}_{WO}$, the third comparator 15l produces an output signal α. The signal α indicates whether or not the wheel velocity $V_W$ is increasing, and on the basis of the signal α, decision is made as to a timing for starting the reduction of hydraulic braking pressure.

The output terminal of the first comparator 13l is connected to an input terminal of an AND gate 16l and an input terminal of an OR gate 17l. The output terminal of the second comparator 14l is connected to input terminals of the AND gate 16l and the OR gate 17l. The output terminal of the third comparator 15l is connected to an input terminal of the OR gate 17l.

The output terminal of the AND gate 16l is connected in an inverted manner to input terminals of AND gates 18l and 19l and to an output terminal 20l. The output terminal of the OR gate 17l is connected to an input terminal of the AND gate 18l and the output terminal 22l and, in an inverted manner, to an input terminal of the AND gate 19l. Moreover, the output terminal of the AND gate 19l is connected to an output terminal 21l.

In the front wheel control section 9a having the above-described construction, a signal indicative of a command to reduce braking oil pressure is supplied to the output terminal 20l and an output terminal 20r; a signal indicative of a command to increase braking oil pressure is supplied to the output terminal 21l and an output terminal 21r, and; a signal indicative of a command to maintain braking oil pressure at a constant level is supplied to the output terminal 22l and an output terminal 22r. The modulator Mfl is actuated in response to the signals supplied from the output terminals 20l, 21l and 22l, while the modulator Mfr is actuated in response to the signals supplied from the output terminals 20r, 21r and 22r, and this provides individual anti-lock control of the brakes Bfl and Bfr.

The construction of the rear wheel control section 9b will be described below, with specific reference to FIG. 4. However, since the construction of the rear wheel control section 9b is similar to that of the front wheel control section 9a, like symbols are used for the sake of simplicity to denote like or corresponding elements in the front wheel control section 9a without using the suffixes l and r.

It should be particularly noted that the wheel velocities detected by the detectors 11r and 11l are supplied to a low speed selector circuit 23, and the lower wheel velocity selected by the low speed selector circuit 23 is fed to a first comparator 13 and an operation circuit 12. Specifically, anti-lock control is carried out on whichever of the left and right rear wheels Wrr and Wrl may be more easily locked, namely, the wheel having the lower wheel velocity of the two, and the operations of the modulators Mrr and Mrl are synchronously controlled in response to the control signals supplied at the output terminals 20, 21 and 22.

In addition, in the rear wheel control section 9b, a flip-flop 24, AND gates 25, 26 and an OR gate 27 are interposed between the output terminal of the first comparator 13 and an input terminal of the OR gate 17. Specifically, the output terminal of the first comparator 13 is connected to a set input terminal S of the flip-flop 24 and an input terminal of the AND gate 25. The signal detected by the actuation detector 2 is supplied to an input terminal of the AND gate 26 and, in an inverted manner, to the other input terminal of the AND gate 25. A set output terminal Q of the flip-flop 24 is connected to the other input terminal of the AND gate 26. The output terminals of the AND gates 25 and 26 are connected to the input terminals of the OR gate 27, and the output terminal of the OR gate 27 is connected to an input terminal of the OR gate 17.

In addition, a braking operation detector 29 is connected to a reset input terminal R of the flip-flop 24 in an inverted manner, the detector 29 being arranged to produce a high level output signal when detector 29 detects the braking operation performed by a brake pedal 28 (see FIG. 2).

According to such a construction, when the lock mechanism 1 is not in operation, the AND gate 26 provides a low level output on the basis of the low level signal detected by the actuation detector 2, while, when the signal λ of the first comparator 13 is at a high level, the output of the AND gate 25 assumes a high level and is input to the OR gate 17 through the OR gate 27. On the other hand, when the lock mechanism 1 is in operation, the actuation detector 2 provides a high level output and the signal output of the AND gate 25 assumes a low level, irrespective of the level of the signal output of the first comparator 13. During this time, when the output signal λ of the first comparator 13 is at a high level, a signal output from the set output terminal Q of the flip-flop 24 maintains a high level until the output of the braking operation detector 29 assumes a low level upon completion of the braking operation. Therefore, during this time, the AND gate 26 supplies a high level signal to the OR gate 17 through the OR gate 27. Specifically, when an anti-lock control operation is undertaken in the directly coupled four wheel drive mode, the output of the AND gate 19, that is, the output at the output terminal 21 never assumes a high level and the hydraulic pressure applied to the respective rear wheel brakes Brr and Brl is reduced or maintained at a constant level until the braking operation is completed.

The operation of the first embodiment will be described hereafter. When the lock mechanism 1 is not in operation and the wheels are in danger of being locked, the front wheel brakes Bfr and Bfl are individually controlled by the front wheel control section 9a and the rear wheel brakes Brr and Brl are synchronously controlled by the rear wheel control section 9b. In addition, since the output of the AND gate 26 in the rear wheel control section 9b is always at a low level, the action of the rear wheel control section 9b is substantially the same as that of the front wheel control section 9a.

When an anti-lock control operation is undertaken in a directly coupled four wheel drive mode in which the lock mechanism 1 is actuated, although the front wheel control section 9a provides the same control as that during the non-operational mode of the lock mechanism 1, hydraulic braking pressure is kept at a lower level in the rear wheel control section 9b than in the front wheel control section 9a. Specifically, when there is no risk of the wheels being locked, by virtue of a reduction in braking oil pressure, the signals β and λ in the rear wheel control section 9b assume a low level, respectively, whereas, during the braking operation, since the output of the OR gate 17 is at a high level, the output of the AND gate 18 assumes a high level, so that the output terminal 22 provides a signal indicative of a command to maintain hydraulic braking pressure at a constant level. Therefore, the hydraulic braking pressure applied to each of the rear brakes Brr and Brl is maintained at a lower level than that of the front brakes Bfr and Bfl and the incidence of slippage is thereby reduced. In consequence, the interference of the front wheels Wfr and Wfl with the rear wheels Wrr and Wrl is kept at a low level, thereby enabling optimal anti-lock control.

When the conditions of the road surface change during the braking operation, the coefficient of friction of the road surface is occasionally reduced. In this case, if the braking pressure is maintained at a constant level as described above, the braking pressure occasionally becomes too high. During this time, when it is judged that the wheels are just about to become locked again; high level signals λ and β are supplied at the output of the first and second comparators 13 and 14, respectively and thus the braking pressure is reduced.

During the directly coupled four wheel drive operation, since the front wheel control section 9a individually controls the front wheel modulators Mfr and Mfl, excellent effects can be provided with respect to braking distance and travel stability. Specifically, when the front wheels Wfr, Wfl and the rear wheels Wrr, Wrl are rigidly connected with each other, the braking force acting upon the front wheels Wfr, Wfl tends to affect the rear wheels Wrr, Wrl. Therefore, in a high level control system in which the modulators Mfr and Mfl are synchronously controlled on the basis of a higher one of the velocities of the front wheels Wfr and Wfl, the velocities of the front wheel Wfr and Wfl, the velocities of the rear wheels Wrr and Wrl become lower than the velocities of the front wheels Wfr and Wfl which are rotating at a higher speed, thus leading to an increase in the incidence of slippage and the deterioration of travel stability. On the other hand, in a low level control system in which the modulators Mfr and Mfl are synchronously controlled on the basis of a lower front wheel velocity, the velocity of each of the rear wheels Wrr, Wrl exceeds that of the lower front wheel velocity, thereby occasionally extending the braking distance.

As a modification of the first preferred embodiment, the flip-flop 24 may be arranged to supply a high level set output during the time when the signal λ has dropped or during the time when the signal β rises and falls.

Figure 5:
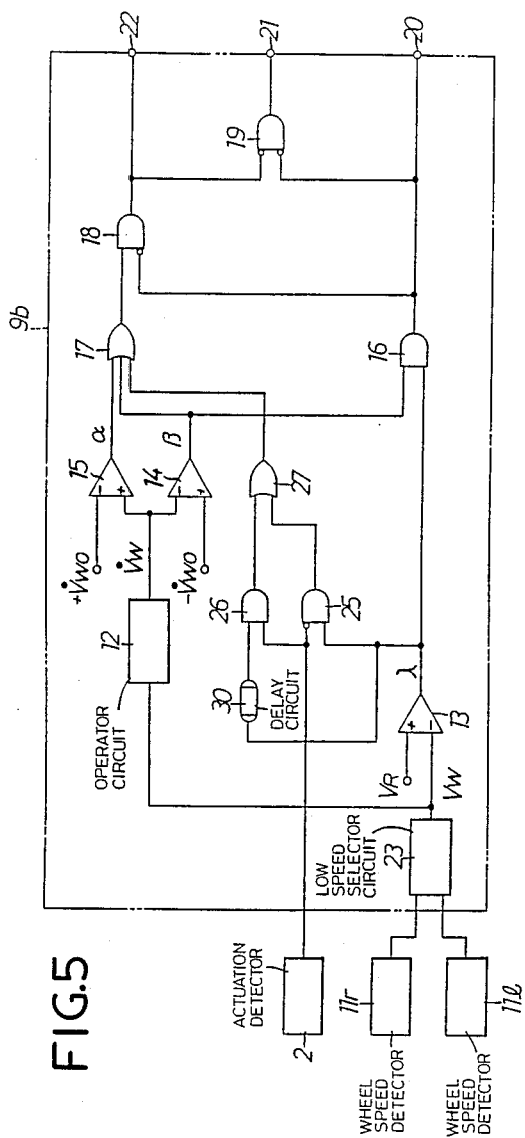
FIG. 5 is a circuit diagram similar to FIG. 4 showing a rear wheel control section constituting a part of a second preferred embodiment of this invention.
Figure 5A:
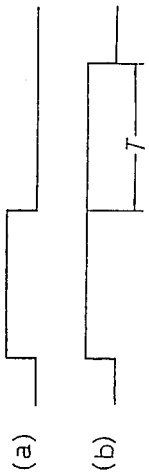
FIG. 5A is a chart showing the waveforms of a delay circuit incorporated in the rear wheel control section shown in FIG. 5.

FIG. 5 is a circuit diagram of the second preferred embodiment of this invention, in which like symbols are used, for the sake of simplicity, to denote like or corresponding elements to those in the above-described first embodiment. In the rear wheel control section 9b illustrated in FIG. 5, instead of the flip-flop 24 used in the first embodiment, a delay circuit 30 is disposed between the first comparator 13 and the AND gate 26. When a signal such as that shown in FIG. 5A(a) is input to the delay circuit 30, the circuit 30 produces an output signal which is at a high level during the time when signal (a) is at a high level and maintains the high level for a predetermined period T (for example, 0.5 to 1 seconds) after the fall of the input signal (a).

According to the second preferred embodiment, when the anti-lock control operation is undertaken, braking oil pressure is maintained at a lower level until the period T elapses after the rear wheels Wfr, Wfl are no longer in danger of being locked. With this arrangement as well, the interference of the rear wheels Wrr, Wrl with the front wheels Wfr, Wfl is maintained at a low level, and this enables optimal antilock control.

As a modification of the second preferred embodiment, the signal $\beta$ may be maintained at a high level by the predetermined period T by the delay circuit 30.

Figure 6:
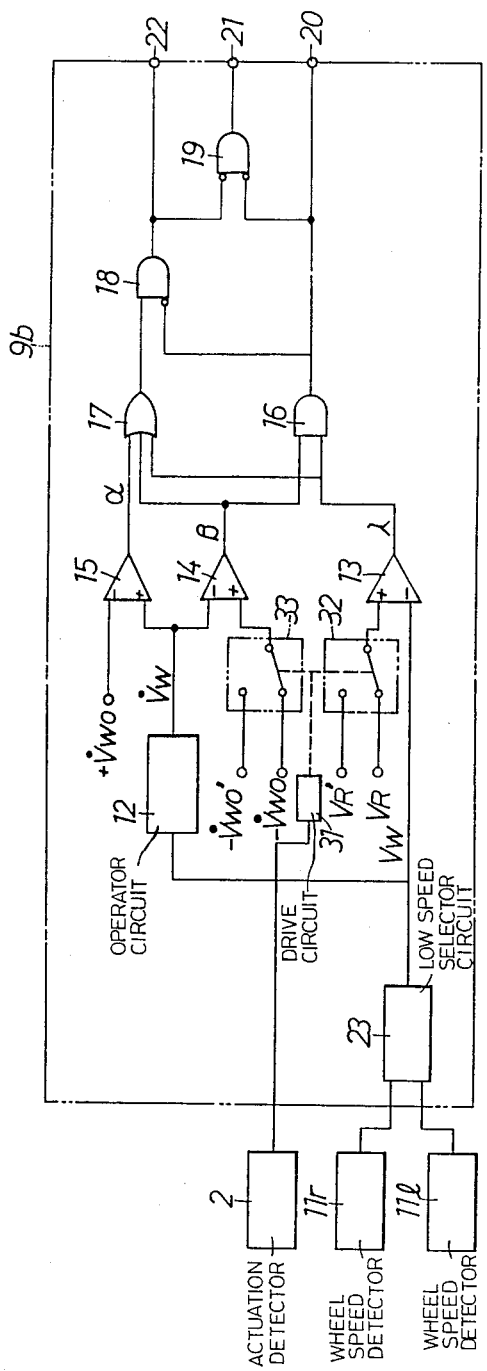
FIG. 6 is a circuit diagram similar to FIG. 4 showing a rear wheel control section contituting a part of a third preferred embodiment of this invention.

FIG. 6 is a circuit diagram of the third preferred embodiment of this invention, in which like symbols are used, for the sake of simplicity, to denote like or corresponding elements to those in the above-described embodiments. A switching circuit 32 is utilized to selectively supply an inverted terminal of the first comparator 13 with either the reference wheel velocity $V_R$ or a reference wheel velocity $V_R'$ which is greater than the reference wheel velocity $V_R'$ while a switching circuit 33 selectively supplies an inverted terminal of the second comparator 14 with either the reference wheel deceleration $-\dot{V}_{WO}$ or a reference wheel deceleration $-\dot{V}_{WO}'$ which is greater than the reference wheel deceleration $-\dot{V}_{WO}$. The switching circuits 32 and 33 are switched by a drive circuit 31, and, when the actuation detector 2 supplies a high level output signal, that is, in the directly coupled four wheel drive mode, the drive circuit 31 drives the switching circuits 32 and 33 so that the greater reference values $V_R'$ and $-\dot{V}_{WO}'$ may be used as the reference values of the first and second comparators 13 and 14.

According to the third preferred embodiment, in the directly-coupled four wheel drive mode, the signals $\lambda$ and $\beta$ indicative of a command to reduce braking oil pressure more readily assume a high level in the rear wheel control selection 9b than in the front wheel control section 9a. Hence, since the hydraulic pressure applied to the rear wheel brakes Brr, Brl is maintained at a lower level than that of the front wheel brakes Bfr, BFl, the interference of the rear wheels Wrr, Wrl with the front wheels Wfr, Wfl is maintained at a low level, which enables optimal antilock control.

In the above-described preferred embodiments, although the rear wheel brakes Brr, Brl are synchronously controlled by a low select system, they may be individually controlled.

Figure 7:
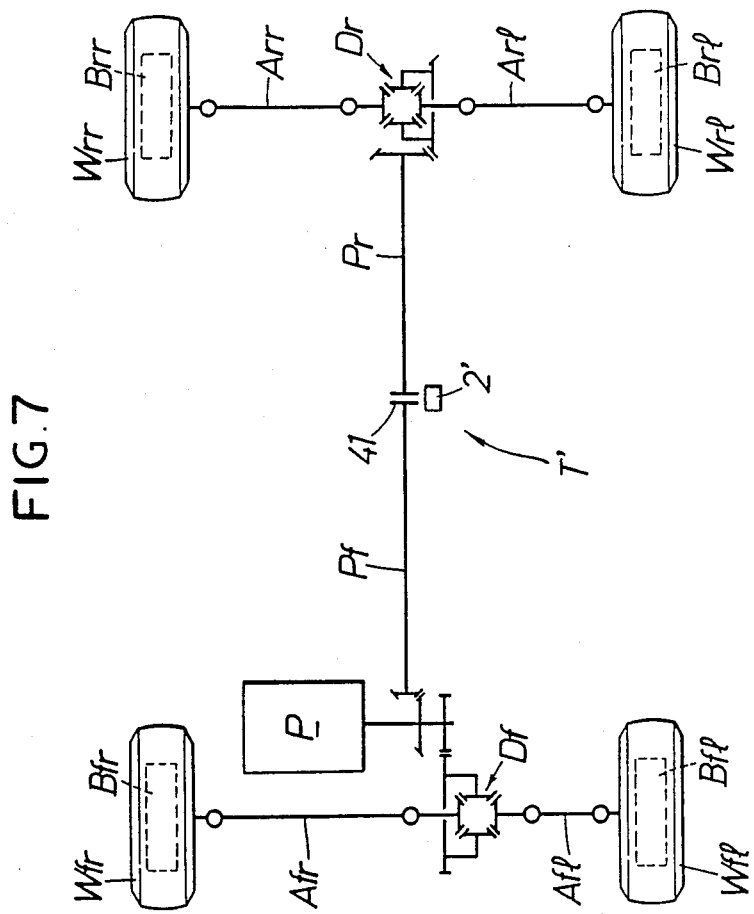
FIG. 7 is a schematic diagram similar to FIG. 1 but showing a drive system incorporating a fourth preferred embodiment.

FIG. 7 is a schematic diagram of the fourth preferred embodiment of this invention, in which like symbols are used, for the sake of simplicity, to denote like or corresponding elements to those in the above-described preferred embodiments.

As shown, the power unit P is connected to an input of the front differential gear Df. The power unit P and the rear differential gear Dr are coupled together by a power transmission assembly T' including the front propeller shaft Pf, the rear propeller shaft Pr and a clutch 41 which couples the shafts Pf and Pr together. The clutch 41 is capable of being manually operated, and, when the clutch 41 is engaged, the vehicle is set in the directly coupled four wheel drive mode in which the braking force acting upon the front wheels Wfr, Wfl is directly transmitted to the rear wheels Wrr, Wrl. In addition, the clutch 41 includes an actuation detector 2' arranged to detect when the clutch 41 is actuated.

Figure 3:
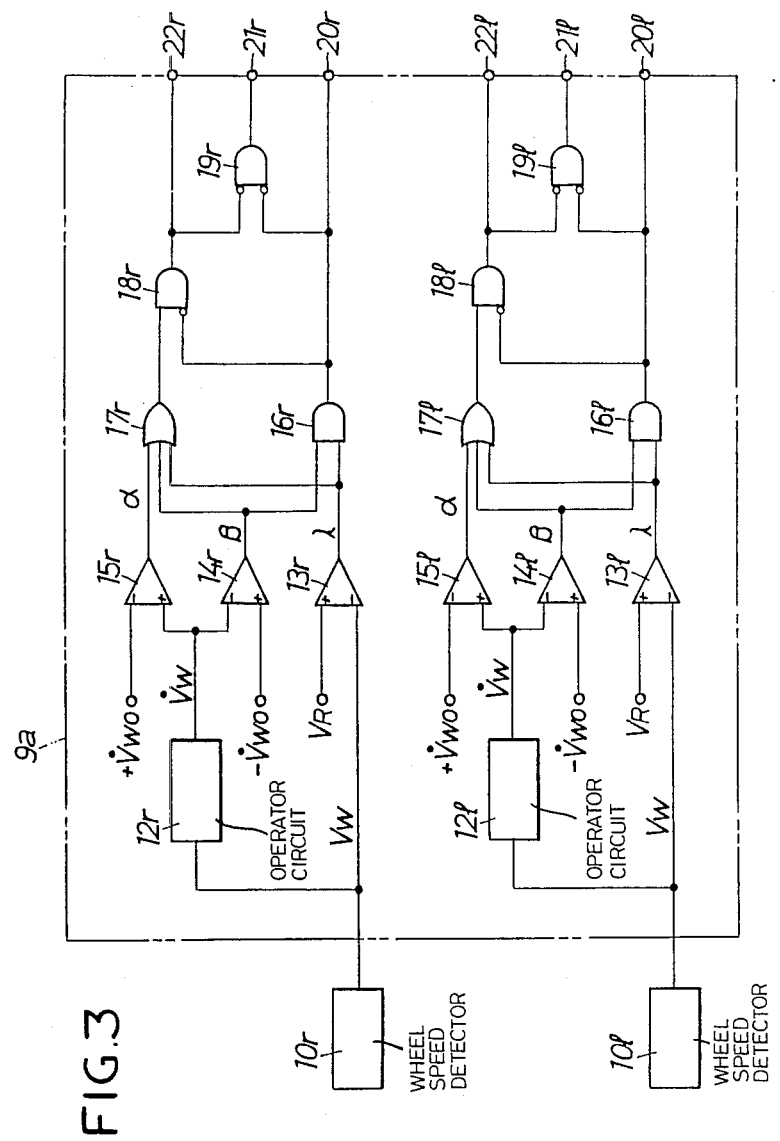
FIG. 3 is a circuit diagram of a front wheel control section contituting a part of the first preferred embodiment of this invention.
Figure 4:
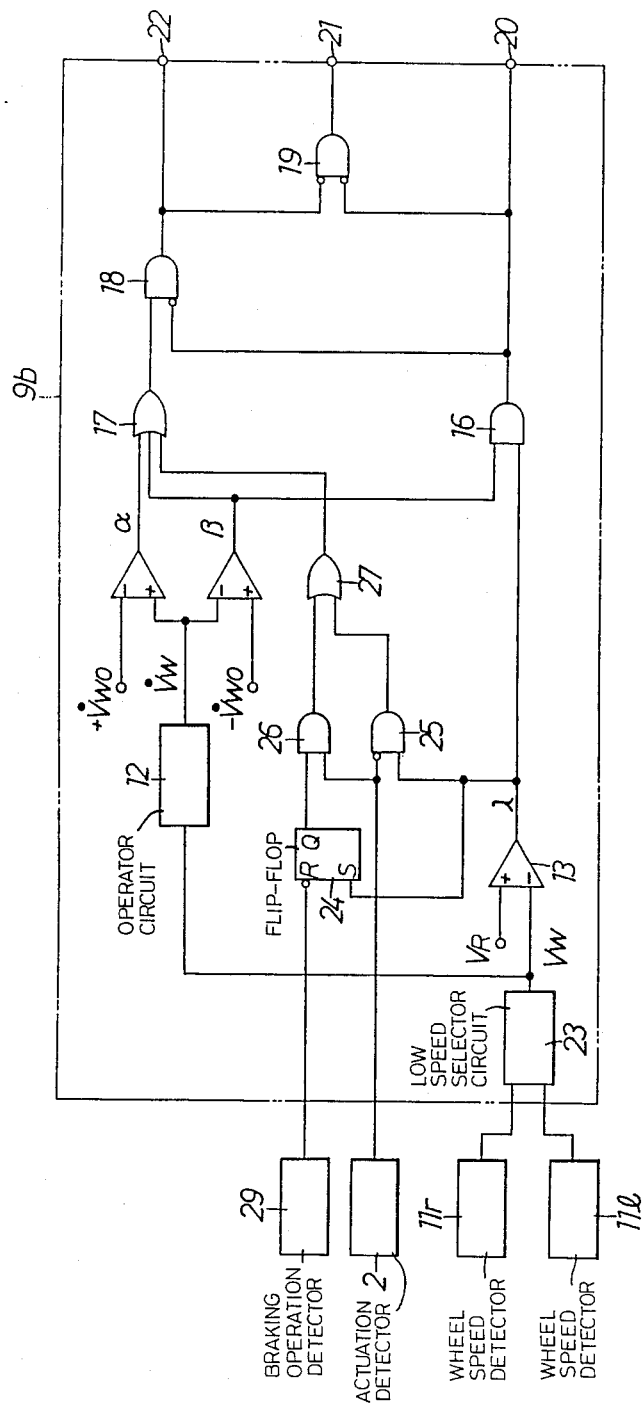
FIG. 4 is circuit diagram of a rear wheel control section constituting a part of the first preferred embodiment of this invention.

The hydraulic pressure applied to each of the brakes Bfr, Bfl, Brr and Bfl is controlled by the hydraulic braking system 7 shown in FIG. 2, and in addition, the hydraulic braking system 7 includes the antilock control device 9 shown in FIGS. 2, 3 and 4.

According to the fourth preferred embodiment, when the braking operation is undertaken in the directly coupled four wheel drive mode in which the clutch 41 is engaged, the hydraulic pressure applied to the respective rear brakes Brr, Brl is set to a low level and thus interference of the front wheels Wfr, Wfl with the rear wheel Wrr, Wrl is maintained at a lower level, thereby enabling optimal antilock control.

While the invention has been described in relation to a specific embodiment thereof, it would become apparent to those skilled in the art that numerous modifications and variations can be made within the scope and spirit of the invention as defined in the attached claims.

What is claimed is:

1. A four wheel drive vehicle with an antilock braking system comprising:
   front and rear axles each having left and right wheels with respective brakes;
   a power transmission assembly between said axles for selectively coupling said axles together in direct driving relation or uncoupling said axles so that only one of said axles is driven;
   a hydraulic braking system coupled to said brakes for controlling hydraulic braking pressure applied to said brakes;
   an antilock control means in said hydraulic braking system for controlling said hydraulic braking pressure to reduce the pressure applied to said brakes when a wheel is about to become locked;
   said antilock control means including a front wheel control section for controlling the hydraulic pressure applied to the brakes associated with the wheels on the front axle, and a rear wheel control section for controlling the hydraulic pressure applied to the brakes associated with the wheels on the rear axle;
   said rear wheel control section including means for maintaining the hydraulic braking pressure applied to the brakes of the wheels on the rear axle at a lower level when said power transmission assembly couples said axles together in direct driving relation as compared to the hydraulic braking pressure when the power transmission assembly uncouples said axles.

2. A four wheel drive vehicle with an antilock braking system as claimed in claim 1 wherein said rear wheel control section includes means for controlling the brakes on the wheels on the rear axle synchronously.

3. A four wheel drive vehicle with an antilock braking system as claimed in claim 1 wherein said means in said rear wheel control section includes logic elements operative to produce an output signal which prevents increase in braking pressure in the brakes on the rear axle when said axles are coupled together.

4. A four wheel drive vehicle with an antilock braking system as claimed in claim 3 comprising an actuation detector for sensing coupling of said axles together, said detector being connected to said logic elements for producing said output signal when the axles are coupled together.

5. A four wheel drive vehicle with an antilock braking system as claimed in claim 4 comprising a braking operation detector for detecting a braking operation, said braking operation detector being connected to said logic elements to maintain said output signal while said braking operation takes place.

6. A four wheel drive vehicle with an antilock braking system as claimed in claim 5 wherein said logic elements include a flip-flop connected to said braking operation detector.

7. A four wheel drive vehicle with an antilock braking system as claimed in claim 4 wherein said logic elements include a delay circuit for maintaining the hydraulic braking pressure applied to the brakes of the wheels on the rear axle at said lower level for a predetermined period after the braking pressure has been reduced in response to sensing locking of the brakes of one of said wheels on the rear axle.

8. A four wheel drive vehicle with an antilock braking system as claimed in claim 4 wherein said logic elements include comparators having two levels of set inputs, switch means for switching said two levels of set inputs to said comparators and drive means coupled to said actuation detector for switching said switch means in response to coupling and uncoupling of said axles.

9. A four wheel drive vehicle with an antilock braking system as claimed in claim 4 comprising wheel speed detectors for sensing the speed of rotation of the wheels on the rear axle and a low speed detector connected to the wheel speed detector for supplying an output signal to said logic elements representative of the speed of the slower wheel.

10. A four wheel drive vehicle with an antilock braking system as claimed in claim 1 wherein said power transmission assembly comprises a differential gear including a lock mechanism.

11. A four wheel drive vehicle with an antilock braking system as claimed in claim 1 wherein said power transmission assembly comprises a clutch which is manually engaged and disengaged.

12. A four wheel drive vehicle with an antilock braking system as claimed in claim 1 wherein said means in said rear wheel control section maintains the braking pressure applied to the brakes of the wheels on the rear axle at a lower level than the braking pressure applied to the brakes of the wheels on the front axle when the axles are coupled together.

13. A method of controlling the hydraulic braking pressure supplied to brakes on front and rear wheels respectively on the front and rear axles of a four wheel vehicle in which the front and rear axles can be selectively coupled and uncoupled in two-wheel and four-wheel drive modes, said method comprising:
supplying hydraulic braking pressure to the brakes by a hydraulic braking system,
controlling the hydraulic braking pressure applied respectively to the front and rear wheels separately and independently of one another, and
maintaining the hydraulic braking pressure applied to the brakes of the rear wheel at a lower level when the axles are coupled together in four-wheel drive as compared to the braking pressure when the axles are uncoupled.

14. A method as claimed in claim 13 comprising manually engaging and disengaging a clutch to effect coupling and uncoupling of said axles respectively.

15. A method as claimed in claim 13 comprising locking and unlocking a differential gear to effect coupling and uncoupling of said axles respectively.

16. A method as claimed in claim 13 wherein the hydraulic braking pressure is prevented from increasing when the axles are coupled together.

17. A method as claimed in claim 13 wherein the hydraulic braking pressure is supplied to the brakes on the front wheels based on sensing locking of the front wheels such that the braking pressure is reduced when locking conditions are sensed, the hydraulic braking pressure applied to the braxes on the rear wheels being maintained at said low level when the axles are coupled together and being reduced in pressure when locking conditions of said rear wheels are sensed.

18. A method as claimed in claim 17 wherein the reduced braking pressure applied to the brakes on the rear wheels is preserved for a pre-determined period of time after locking conditions are no longer detected.

19. A method as claimed in claim 13 wherein the hydraulic braking pressure applied to the brakes of the rear wheels is less than the braking pressure applied to the front wheels when the axles are coupled together.

* * * * *